United States Patent [19]

Donald et al.

[11] 4,000,912
[45] Jan. 4, 1977

[54] SHOCK ABSORBER

[75] Inventors: James E. Donald; Gerald I. Weigt, both of Davis, Calif.

[73] Assignee: MSE Corporation, Mountain View, Calif.

[22] Filed: Feb. 21, 1975

[21] Appl. No.: 551,901

[52] U.S. Cl. .................................. 280/701; 267/71
[51] Int. Cl.[2] ..................................... B60G 11/24
[58] Field of Search .............. 280/124 A, 701, 724; 267/61, 70, 71, 136; 16/44

[56] References Cited

UNITED STATES PATENTS

| 2,227,875 | 1/1941 | Boden | 16/44 |
|---|---|---|---|
| 2,507,980 | 5/1950 | Knapp | 16/44 |
| 2,525,506 | 10/1950 | Wiedman | 16/44 |
| 2,577,244 | 12/1951 | Hedgpeth | 16/44 |
| 2,744,761 | 5/1956 | Steele | 16/44 |
| 2,915,776 | 12/1959 | Hanson | 16/44 |

Primary Examiner—Philip Goodman
Assistant Examiner—John A. Carroll
Attorney, Agent, or Firm—Bielen and Peterson

[57] ABSTRACT

A shock absorber utilizing two separating members hingedly attached at their first ends and an arm connected to one of the members to dampen impact shock normally transmitted to a body connected to the other member.

8 Claims, 4 Drawing Figures

SHOCK ABSORBER

BACKGROUND OF THE INVENTION

The present invention relates to a novel shock absorber which may be used with or without a wheel found on most vehicles such as carts, wheel chairs, cycles, caster supported items and the like, to absorb impact to a body such as a vehicle.

Many types of shock absorbers have been invented to control the vibratory motion of a body subject to impact, such as a vehicle traveling over rough surfaces, producing such impact to each vehicle wheel. The common embodiment has been in the nature of a hydraulic piston fitted within a cylinder which contains various springs, valves, and compartments. The resistance to fluid flow limits the vibrational rate of the vehicle. Also, various shock absorbers have been created employing the natural resilience of certain materials, such as cork, rubber, wood and the like which is fabricated in the form of a member placed between the wheel and the suspended body. Simple spring shock absorbers have also been manufactured for use in recoil mechanisms that generally do not entail vehicular movement.

The hydraulic shock absorber possesses drawbacks in that the construction is complicated and expensive to manufacture, repair, and install.

Resilient materials wear out quickly and tend to lack rebound strength. Spring absorbers, although possessing good dampening qualities have litte or no lateral stability under shearing forces often encountered with vehicular activity.

SUMMARY OF THE INVENTION

In accordance with the present invention, a shock absorber is provided having a spring means placed between two members, preferably plates. In the case of a vehicle, one of the members attaches to a supporting wheel. The spring bears on a first member which is substantially parallel to the axle of the wheel. The first plate connects to a second plate at one end via a pivotal axis and the plates may touch one another at some portion. The second plate attaches to the vehicle by any known suitable means. An elongated pin affixes, preferably to the second plate, and may be coaxially positioned with respect to the spring when the spring is helical. The pin may also provide the other bearing surface of the spring means. The wheel's contact with an uneven surface tends to spread the two plates against the dampening force of the spring. The wheel moves in a rotational direction about the pivotal axis between the plates, but returns to its original position by the rebounding force exerted by the spring means.

The impact or shock force imparted to the wheel is absorbed by the compression of the spring means in combination with the inertial force necessary for pivoting of the wheel.

The shock absorber may also be mounted to rotate in a vertical axis by the use of a ball bearing and shaft affixed to the first member.

It is, therefore, an object of the present invention to provide a simple and efficient shock absorber to allow the smooth travel of vehicles on rough or uneven surfaces, without the use of hydraulic means to absorb the impact force normally encountered.

It is another object of the present invention to employ a spring means and a pivotal axis in combination with a vehicular wheel to absorb the shock due to wheel impact during travel of such vehicle along uneven surfaces.

It is yet another object of the present invention to provide a spring loaded vehicle shock absorber possessing great lateral stability with respect to shear stresses in the direction of travel of the shock absorber and vehicle thereattached.

It is another object of the present invention to provide a shock absorber to control impact forces normally transmitted to a body.

The invention possesses other objects and advantages, especially as concerns particular features and characteristics thereof, which will become apparent as the specification continues. For a better understanding of the invention, reference is made to the following detailed description.

DESCRIPTION OF THE PREFERRED EMBODIMENTS

Figure 1:
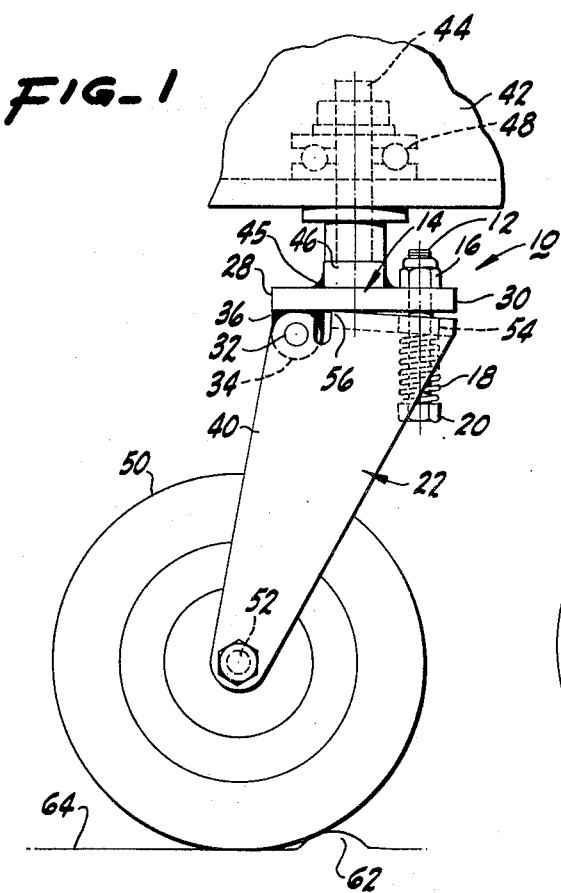
FIG. 1 is a side elevational view of the shock absorber riding on an uneven surface.

With reference to the drawings, the shock absorber as a whole is depicted in FIG. 1 by reference character 10 which includes a fastening means, such as a bolt or pin 12. Bolt or pin fixedly attaches to a first member 14, which generally takes the form of a plate, by any suitable means such as nut 16 fastened to the threaded end of bolt 12. Spring means 18 bears on the head 20 of bolt 12 and the under surface of a second member 22, most clearly shown in FIG. 3. The second member 22 may take any form, but as shown in the drawings, the preferred embodiment generally shows a plate having a first end portion 24 and a second end portion 26. Likewise, the first member 14 has a first end portion 28 and a second end portion 30.

The first end portion 28 of the first member 14 hingedly attaches to the first end portion 24 of the second member by the use of pivot pin 32 which is encased in a housing 34. Weld seam 36 serves to affix housing 34 to the first end portion 28 of first member 14. Pivot pin 32 also attaches to the first end portion 24 of the second member 22 by snugly fitting within channel 38.

Figure 3:
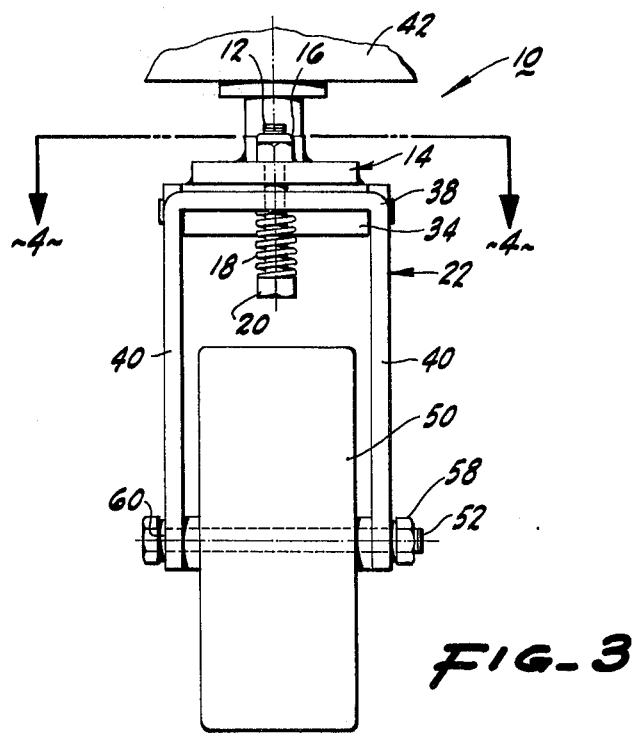
FIG. 3 is an end elevational view of the shock absorber.
Figure 4:
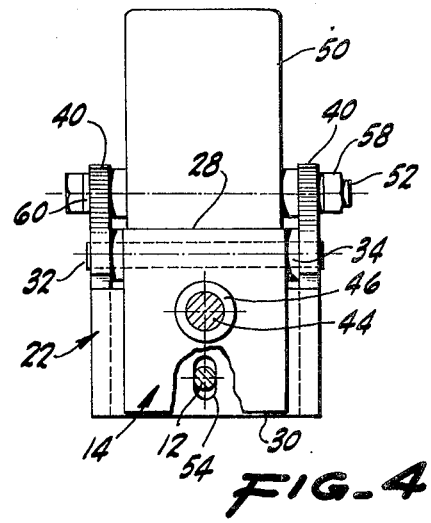
FIG. 4 is a sectional view taken along lines 4-4 of FIG. 3.

Arm 40 attaches to the second member 22 to receive the impact forces normally transmitted to the body 42. The shaft 44 having an enlarged head 46 welded to the first member 14 at weld seam 45 performs the function of connection of the body 42 to the shock absorber 10. As is well known in the art, there are innumerable methods of connection suitable for use in the present invention. As shown in FIGS. 1 and 3, the shaft 44 may be rotatably mounted to the body 42 for rotation about a vertical axis by placement of a ball bearing 48 within the body 42.

In the case where body 42 is a vehicle, a wheel 50 is rotatably mounted to arm 40 for rotation about a horizontal axis. Arm 40 might take the form of a fork bearing on the wheel axle 52 on either side of the wheel 50. Nuts 58 and washers 60 prevent slippage of axle 52.

The bolt 12 passes through opening 54 in second member 22. The opening 54 takes an elongated or oval form to allow relative movement between the bolt or pin 12 and second member 22, as will be discussed hereinafter. Second member 22 may or may not engage first member 14 when no impact force exists on the shock absorber 10. As depicted in FIG. 1, the two members touch at point 56.

In operation, an impact force normally transmitted to body 42 is received by arm 40. Where a wheel 50 is attached to arm 40, the wheel 50 would typically hit a bump 62 in the travel surface 64.

Figure 2:
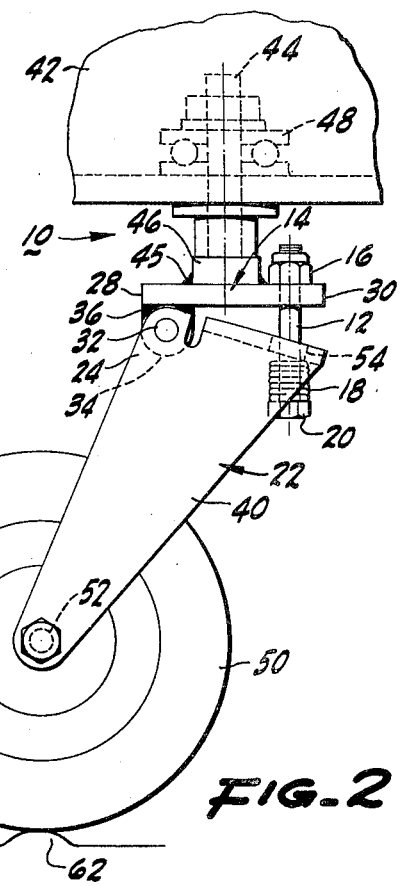
FIG. 2 is a broken side elevational view of the shock absorber after encountering an impact force on the wheel.

At this time, the arm 40 would tend to rotate about pivot pin 32, as shown by the directional arrow in FIG. 2, causing the second end portions 30 and 26 of the members 14 and 22 to separate. Spring means 18 bearing on the head 20 of bolt 12 and the under surface of second member 22, resists such rotation by the force required to compress the spring means. As is well known in the art, springs may take various forms, and the rotation resistance may be resisted by either the force required to compress, extend or deform the spring in any manner. In any case, any spring means urging the first member 14 and the second member 22 toward one another will suffice. The impact force also tends to accelerate the wheel 50 in the direction of rotation. Thus, the pull of gravity and the action of spring means dampens the impact force applied.

It should be noted that the spring means 18 may be varied in strength to prevent excessive travel of the second end portions 30 and 26 of the members 14 and 22 and excessive rebound or snap-back of the members. Where a wheel 50 is employed, a strong spring also prevents extreme dip by the body 42 when an impact force is encountered. Bolt or pin 12 travels across opening 54 during the separation of the members, therefore, the opening is oval, oblong, or elliptically shaped, or the like to allow such movement.

While in the foregoing specification, embodiments of the invention have been set forth in considerable detail for purposes of making a complete disclosure of the invention, it will be apparent to those of ordinary skill in the art, that numerous changes may be made in such details without departing from the spirit and principles of the invention.

What is claimed is:

1. A shock absorber to dampen impact forces normally transmitted to a body, comprising:

a. a first member attached to the body and having a first and second end portion;
   b. a second member having a first and second end portion, the first end portion of said first member hingedly attached to the first end portion of said second member; said second ends of said members free of intermediate shock absorbing means.
   c. spring means for urging the rotation of said second ends of said first and second member toward one another and resisting rotation of said second ends of said members away from one another, said spring means including a spring, engaging said second end of said second member and a pin fixedly attached to the second end of said first member and passing through an elongated opening in said second member said pin moving freely within said elongated opening along its axis of elongation with the rotation of said second ends of said members away from one another, said pin remaining fixedly attached to said second member during rotation; said spring also engaging said pin.
   d. arm having an end attached to said second member to receive impact forces such that said second ends of said first and second members rotate away from one another upon reception of an impact force by said arm.

2. The shock absorber of claim 1 which additionally comprises a wheel affixed to the end of said arm opposite said end of said arm attached to said second member.

3. The shock absorber of claim 2 where said wheel supports said body on a surface when the body serves as a vehicle on such a surface.

4. The shock absorber of claim 1 in which said first member is rotatably mounted to the body for rotation about a vertical axis and said wheel is rotatable about a horizontal axis.

5. The shock absorber of claim 1 in which said first member engages a portion of said second member in the absence of impact forces.

6. The shock absorber of claim 5 which additionally comprises a wheel affixed to the end of said arm opposite said end of said arm attached to said second member.

7. The shock absorber of claim 6 where said wheel supports said body on a surface when the body serves as a vehicle on such a surface.

8. The shock absorber of claim 7 in which said first member is rotatably mounted to the body for rotation about a vertical axis and said wheel is rotatable about a horizontal axis.

* * * * *